United States Patent
Bangolae et al.

(10) Patent No.: US 10,111,145 B2
(45) Date of Patent: Oct. 23, 2018

(54) COMMUNICATION VIA DEDICATED NETWORK NODES

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Puneet K. Jain, Hillsboro, OR (US); Ana Lucia A. Pinheiro, Breinigsville, PA (US); Hyung-Nam Choi, Hamburg (DE); Mo-Han Fong, Sunnyvale, CA (US); Umesh Phuyal, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/671,220

(22) Filed: Mar. 27, 2015

(65) Prior Publication Data

US 2015/0312822 A1 Oct. 29, 2015

Related U.S. Application Data

(60) Provisional application No. 61/985,349, filed on Apr. 28, 2014.

(51) Int. Cl.
*H04W 36/08* (2009.01)
*H04W 52/02* (2009.01)
(Continued)

(52) U.S. Cl.
CPC ....... *H04W 36/08* (2013.01); *H04W 52/0203* (2013.01); *H04W 76/38* (2018.02); *H04W 36/18* (2013.01); *H04W 52/0229* (2013.01); *H04W 88/08* (2013.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01);
(Continued)

(58) Field of Classification Search
CPC . H04W 36/08; H04W 52/0203; H04W 36/18; H04W 76/04; H04W 88/08; H04W 52/0229; Y02B 60/50
See application file for complete search history.

(56) References Cited

U.S. PATENT DOCUMENTS

2011/0103277 A1 5/2011 Watfa et al.
2012/0088505 A1* 4/2012 Toh ................. H04W 8/186
455/434

(Continued)

FOREIGN PATENT DOCUMENTS

WO 2014051387 A1 4/2014
WO 2014052268 A1 4/2014

OTHER PUBLICATIONS

"Dedicated Core Networks", Work Item Feature, Mar. 24-28, 2013, 5 pages, 3GPP, St. Julien's, Malta.

(Continued)

*Primary Examiner* — Luat Phung
(74) *Attorney, Agent, or Firm* — Spectrum IP Law Group LLC

(57) ABSTRACT

Briefly, in accordance with one or more embodiments, methods to establish and control communication of a dedicated device such as a dedicated user equipment (UE) with dedicated nodes of a network are provided.

6 Claims, 14 Drawing Sheets

(51) Int. Cl.
H04W 76/38 (2018.01)
H04W 36/18 (2009.01)
H04W 88/08 (2009.01)

(52) U.S. Cl.
CPC .......... *Y02D 70/142* (2018.01); *Y02D 70/144* (2018.01); *Y02D 70/162* (2018.01); *Y02D 70/164* (2018.01); *Y02D 70/21* (2018.01)

(56) References Cited

U.S. PATENT DOCUMENTS

| | | |
|---|---|---|
| 2012/0213137 A1 | 8/2012 | Jeong et al. |
| 2013/0028097 A1 | 1/2013 | Barrett |
| 2013/0194991 A1 | 8/2013 | Vannithamby et al. |
| 2013/0201830 A1* | 8/2013 | Wang .................. H04W 4/005 370/235 |
| 2013/0303166 A1* | 11/2013 | Jain ................... H04W 76/048 455/435.2 |
| 2014/0056246 A1 | 2/2014 | Chun et al. |
| 2015/0117285 A1* | 4/2015 | Xie ................... H04W 52/0216 370/311 |
| 2015/0282083 A1 | 10/2015 | Jeong et al. |

OTHER PUBLICATIONS

"3GPP TS 24.312 V12.4.0", Mar. 2014, Technical Specification, pp. 14-29, 3rd Generation Partnership Project, Valbonne France.
International Search Report and Written Opinion received for International Application No. PCT/US2015/023083, dated Sep. 4, 2015, 20 pages.
International Preliminary Report on Patentability received for International Application No. PCT/US2015/023083, dated Nov. 10, 2016, 8 pages.
Korean Patent Application No. 2016-7026652, Notice of Preliminary Rejection, 11 pages, Sep. 7, 2017.
Supplementary Partial European Search Report, EP15785810, 17 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 12)", XP050835229, http://www.3gpp.org/ftp/tsg_sa/WG2_Arch/Latest_SA2_Specs/DRAFT_INTERIM/Archive/, retrieved on Apr. 3, 2014, 84 pages.
Mediatek Inc: "Discussion on non-satisfied relevant scenarios and requirements of FDD-TDD joint Operation", 3GPP Draft; RI-134438 Discussion on Non-Satisfied Relevant Scenarios and Requirements of FDD-TDD Joint Operation Final, 9 vol. RAN WG1, No. Guangzhou, China; Oct. 7, 2013-Oct. 11, 2013 Sep. 28, 2013 (Sep. 28, 2013), XP050717555, Retrieved from the Internet: URL:http://www.3gpp.org/ftp/tsg ran/WGI RL I/TSGRI_74b/Docs/ [retrieved on Sep. 28, 2013], 3 pages.
Notice of Publication for Hong Kong Application No. 17103104.8, dated Nov. 17, 2017, 2 pages.
Notice of Allowance received for Korean Patent Application No. 10-2016-7026652, dated Feb. 26, 2018, 3 pages including 1 page of English translation.
European Search Report, EP Application No. 15785810.1, dated Jan. 23, 2018, 15 pages.
JP Office Action for Application No. JP2016-557297, dated Nov. 21, 2017, 8 pages.
ZTE, Extended Long DRX Mode for UE Power Saving [online], 3GPP TSG-SA WG2#94 S2-124406, Internet <URL: http://www.3gpp.org/ftp/tsg_sa/WG2_Arch/TSGS2_94_New_Orleans/Do cs/S2-124406.zip>, Nov. 6, 2012.
Notice of Allowance received for Japanese Patent Application No. 2016-557297, dated Jun. 19, 2018, 3 pages of notice of allowance and 4 pages of allowed claims in English.

* cited by examiner

COMMUNICATION VIA DEDICATED NETWORK NODES

CROSS-REFERENCE TO RELATED APPLICATIONS

The present application claims the benefit of U.S. Provisional Application No. 61/985,349 filed Apr. 28, 2014. Said Application No. 61/985,349 is hereby incorporated herein by reference in its entirety.

BACKGROUND

Machine-type-communication (MTC) devices are projected to be 50 billion in number over the next decade. These classes of devices may have different requirements from a typical device in a Third Generation Partnership Project (3GPP) system in terms of optional feature support, traffic characteristic support, access priority, congestion management, ratio of signaling to user plane traffic, etc. Many MTC devices and/or applications generate very low user plane traffic on the network and many such MTC devices and/or applications can be considered as low access priority. Low access priority for MTC device and/or application was defined in 3GPP Release 10 technical specifications. Given such large number of devices, even if they use low priority access and send only small amount of data, they have the potential to overload the network, for example the radio access network and/or core network. Operators are concerned with how to efficiently maintain connection of large number of such devices without impacting normal user equipment (UE) or a Human-to-Human communication system and overall system performance. As a cost effective mechanism to support the different classes of applications and/or services and devices and/or users as well, operators are thus considering to deploy separate dedicated core networks for independent scaling of specific feature provisioning for specific user or traffic types and isolating specific users and traffic from each other due to the fact that existing specifications for MTC devices are not able to handle UEs that do not provide low access priority indication and do not support reselection of MME.

A Release 13 work item has been recently approved to enable the deployment of such dedicated core networks where each dedicated core network is dedicated to UEs sharing the same characteristics. Such dedicated core network may be considered as an overlay network that builds on existing network but allows a more efficient handling of specific UEs and traffic types. Creation of such dedicated network nodes becomes easy with technologies such as Software Defined Networking/Network Functions Virtualization (SDN/NFV) in the future, for example instantiation of dedicated MME node as virtual network function.

The new Release 13 work item covers the core network (CN) and currently does not cover radio access network (RAN) aspects, however in order to support the new layered network structures efficiently in future 3GPP releases, RAN aspects also may be considered. Therefore, this invention proposes methods to establish and control communication of dedicated devices with dedicated nodes, for example an enhanced Node B (eNB) in RAN, a mobility management entity (MME), a serving gateway (S-GW) and a packet gateway (P-GW) in the core network. These dedicated nodes may be understood, but not necessarily restricted to, as MTC nodes or low cost and/or low complexity nodes or nodes specialized to particular usage such as small data, health, security, and so on, which may reduce operators capital expenditure (CAPEX) while rolling out new MTC and/or Internet of Things (IoT) type of services. The same concepts also may apply for dedicated devices that can be understood, but not necessarily restricted to, as MTC/IoT or low complexity and/or low cost devices. The dedicated network targets to create more optimized networks in the RAN and/or CN for the new requirements to better support IoT type of services; examples of these types of networks and services are always-on connectivity, small data, frequent data transfer, high priority access, health secure network, video surveillance network, and so on.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
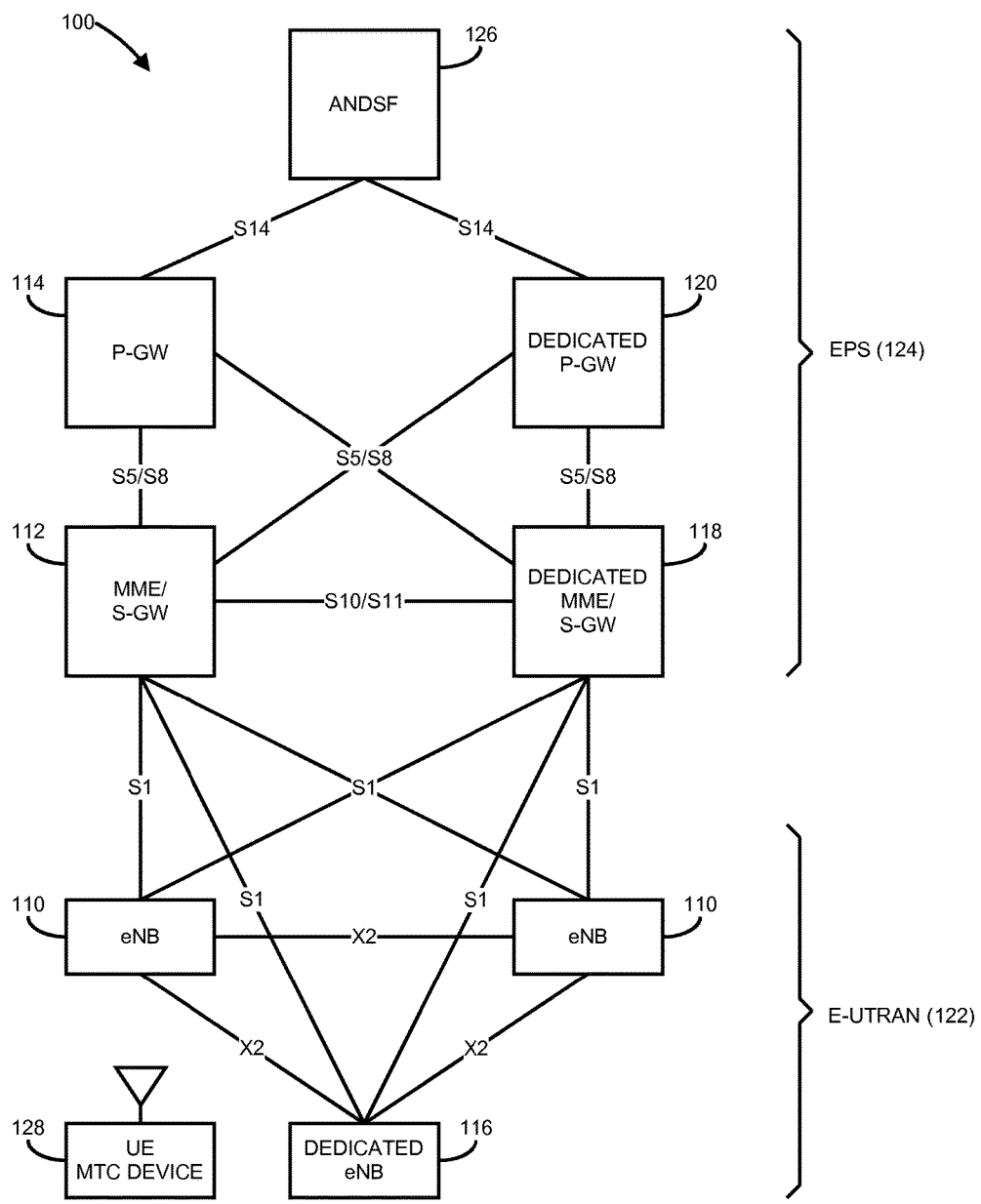
FIG. 1 is a diagram of a network architecture including one or more dedicated network nodes in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network architecture including one or more dedicated network nodes in accordance with one or more embodiments will be discussed. FIG. 1 shows an exemplary architecture of network 100 comprising one or more legacy nodes such as enhanced Node B (eNB), mobility management entity (MME)/Serving Gateway (S-GW) 112, and/or Packet Gateway (P-GW) 114, and one or more dedicated nodes such as dedicated eNB 116, dedicated MME/S-GW 118, and/or dedicated P-GW 120. It is assumed that on the radio access network (RAN) or Evolved Universal Terrestrial Radio Access Network (E-UTRAN) 122 portion of network 100, dedicated eNBs 116 may be interconnected with legacy eNBs 110 via an X2 interface. Furthermore, legacy eNBs 112 and dedicated eNBs 116 may be interconnected with legacy MME/S-GW 112 and/or dedicated MME/S-GW 118 via an S1 interface. On the Evolved Packet System (EPS) 124 portion of network 100, dedicated MME/S-GW 118 may be interconnected with legacy MME/S-GW 112 via an S10/S11 interface wherein the S10 interface is utilized to interconnect MMEs, and the S11 interface is utilized to interconnect S-GWs. Furthermore on the EPS 124 portion of network 100, legacy MME/S-GW 112 may interconnect with legacy P-GW 114 via an S5/S8 interface. Similarly, dedicated MME/S-GW 118 may interconnect with dedicated P-GW 120 via an S5/S8 interface. Legacy P-GW 114 and dedicated P-GW 120 may interconnect with Access Network Discovery and Selection Function (ANDSF) 126 via an S14 interface. In one or more embodiments, a user equipment (UE) machine-type-communication (MTC) device 128 may couple to network 100 and connect with any of the legacy network nodes, and may connect with one or more dedicated network nodes as needed.

Figure 2:
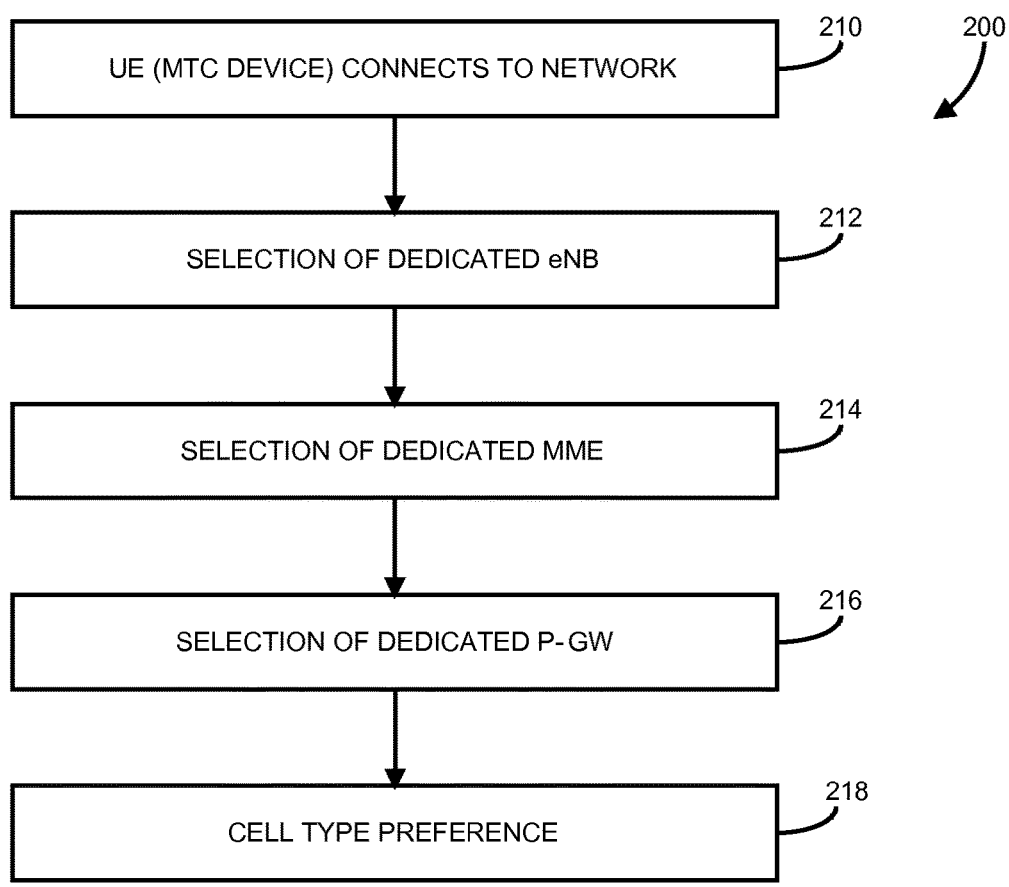
FIG. 2 is a diagram of a method for a given user equipment to connect to a suitable dedicated node in accordance with one or more embodiments.

Referring now to FIG. 2, a diagram of a method for a given user equipment to connect to a suitable dedicated node in accordance with one or more embodiments will be discussed. As shown in FIG. 2, user equipment (UE) 128, as a machine-type-communication (MTC) device, connects with network 100 at block 210. UE 128 optionally may select to communicate with dedicated enhanced Node B (eNB) 116 at block 212. UE 128 optionally may select to communicate with a dedicated mobility management entity (MME) and/or dedicated Serving-Gateway (S-GW) 118 at block 214. UE 128 optionally may select to communicate with a dedicated Packet-Gateway (P-GW) 120 at block 216. UE 128 may select a cell type preference at block 218. Details of the steps of method 200 are discussed in further detail, below.

In one or more embodiments, one or various blocks of method 200 of FIG. 2 may be combined in multiple arrangements to provide a partial of full solution for control of dedicated devices such as UE 128 to connect to various dedicated nodes of network 100. Various combinations and/or sub-combinations of the blocks of method 200 of FIG. 2 also work independently. In one or more embodiments, the terms UE, dedicated UE, dedicated device, MTC device, and UE MTC application may be used interchangeably herein. Special categories of eNB also may be referred to as a dedicated MTC node, a low cost eNB, a low cost MTC eNB, an MTC eNB, and so on, and such special categories of eNBs may be interconnected to corresponding dedicated core network entities, for example with a special dedicated MME, a special dedicated S-GW, a special dedicated P-GW, and so on, as well as the traditional core network and/or radio network entities, and the scope of the claimed subject matter is not limited in these respects.

As another example, an MTC eNB may comprise a small cell eNB. If such a small cell eNB is operated in conjunction with a macro cell eNB in the context of dual connectivity, the dedicated small cell eNB may be operated either as a Master eNB (MeNB) or as a Secondary eNB (SeNB). Moreover, the small cell eNB may have multiple serving cells associated with it by carrier aggregation to create a cell group. Depending on the role of the small cell eNB, the associated group of serving cells may be referred to as Master Cell Group (MCG) or Secondary Cell Group (SCG), although the scope of the claimed subject matter is not limited in these respects.

Figure 3:
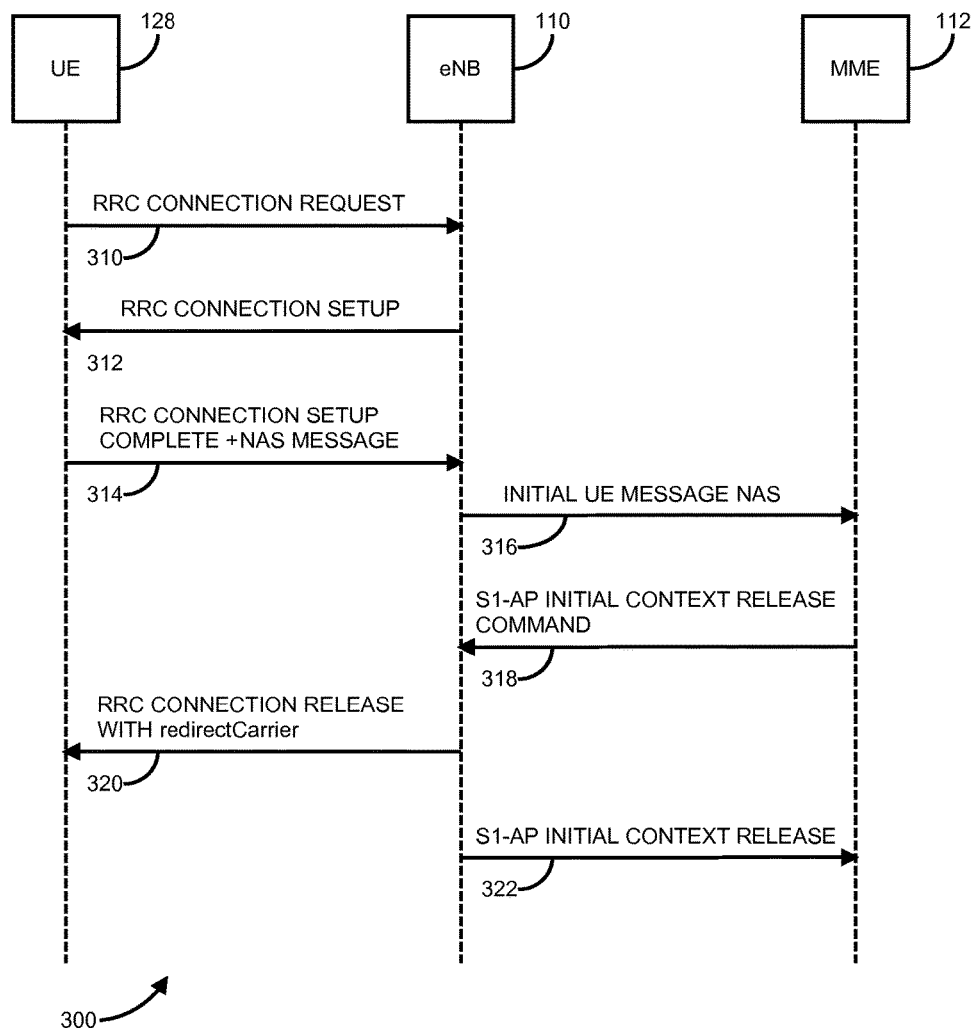
FIG. 3 is a diagram of a method of redirection of a user equipment during an initial attach based at last in part on a power saving mode in accordance with one or more embodiments.

Referring now to FIG. 3, a diagram of a method of redirection of a user equipment during an initial attach based at last in part on a power saving mode in accordance with one or more embodiments will be discussed. Method 300 of FIG. 3 illustrates one option of how user equipment (UE) 128 may select or otherwise be directed to one or more dedicated network nodes of network 100 of FIG. 1. In the option shown in FIG. 3, a Power Saving Mode (PSM) may be utilized as a trigger for redirecting carrier and/or network selection. In or more embodiments, a Power Saving Mode (PSM) may be part of an Radio Resource Control (RRC) RRC_IDLE mode as described in Release 12 of a Third Generation partnership Project (3GPP) standard, although the scope of the claimed subject matter is not limited in this respect. Such a Power Saving Mode may be targeted for UEs 128 having longer periods of inactivity in order to save power. In a Power Saving Mode, the Access Stratum may be deactivated, and UE 128 may not perform any idle mode activities such as monitoring paging channels, performing measurements for cell selection and/or reselection, and so on.

Initially, UE 128 may send an RRC Connection Request message to eNB 110 at step 310, and eNB 110 may respond by sending an RRC Connection Setup message to UE 128 at step 312. UE 128 sends an RRC Connection Setup Complete and non-Access Stratum (NAS) message to eNB 110 at step 314. Utilization of PSM may be requested by UE 128 when UE 128 includes the T3324 timer value within the RRC Connection Setup Complete and NAS message as an Attach/Tracking Area Update (TAU) request message sent to eNB 112 at step 314. Next, eNB 110 forwards the message to Mobility Management Entity (MME) 112 as an Initial UE Message NAS at step 316. If MME 112 accepts the usage of PSM by UE 128, MME 112 will respond with the same or different T3324 timer value in a corresponding accept message.

As there is no specific differentiation made for UEs 128 with specific traffic types or characteristics, other options may be utilized to serve or differentiate such UEs 128. For example, the information that UE 128 is going to use PSM mode, which is understood as a deep sleep mode that usually lasts a long period of time and UE 128 is not reachable for downlink traffic, may be utilized by MME 112 to indicate to eNB 110 to either reject an RRC Connection Request message sent by UE 128 or release an RRC connection with UE 128 and redirect UE 128 to a different carrier and/or dedicated node of network 100 if the current cell is aware of dedicated network carrier frequencies. For example, eNB 110 may send a RRC Connection Release message to UE 128 via eNB 110 as step 320 that includes a redirectCarrier information element with the carrier frequency of dedicated eNB 116. MME 112 may indicate at step 318 a cause for releasing the S1 connection with eNB 110 via an S1-AP Initial Context Release Command, for example, a PSM indication, a UE Inactivity notification, a UE Idle PSM notification, and so on. At step 322 eNB 110 may responds via an S1-AP Initial Context Release message sent to MME 112.

Figure 4:
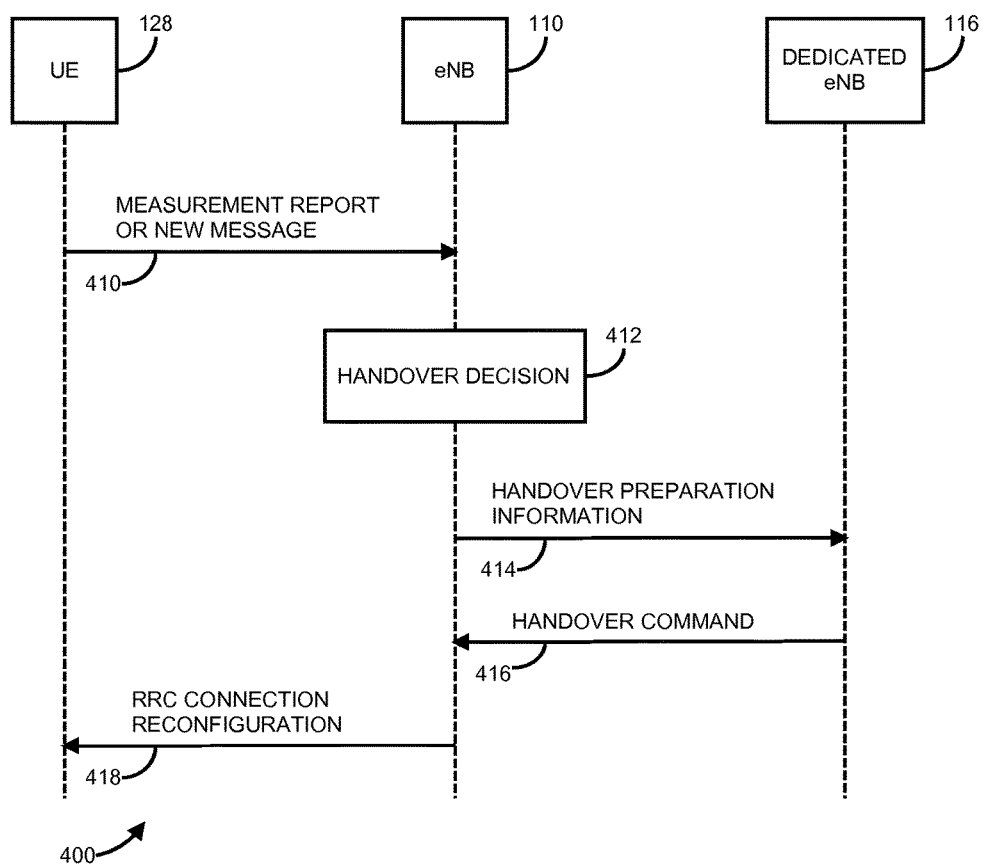
FIG. 4 is a diagram of a method of handover of a user equipment to a dedicated enhanced Node B in accordance with one or more embodiments.

Referring now to FIG. 4, a diagram of a method of handover of a user equipment to a dedicated enhanced Node B in accordance with one or more embodiments will be discussed. Method 400 of FIG. 4 illustrates an option how user equipment (UE) 128 may select or otherwise be directed to one or more dedicated network nodes of network 100 of FIG. 1 using a handover. While a Radio Resource Control (RRC) Connection Release type of message may be an option to redirect UE 128 from one carrier to another, a normal handover procedure may be utilized to move UE 128 in an RRC_CONNECTED mode to another cell. For load balancing during congestion or based on other triggers, for example Power Saving Mode (PSM) indication, Core Network (CN) assistance, new service request, and/or capability exchange, eNB 110 may find another suitable cell that is controlled by dedicated eNB 116 and/or has support of dedicated MME 118 that would be better for UE 128 to communicate with for enhanced service and meeting certain characteristics such as small data or machine-type-communications (MTC) networks. Method 400 of FIG. 4 shows one such example handover procedure to dedicated eNB 116. The existing measurement report message provided by UE 128 to eNB 110 at step 410 may be utilized by eNB 110 to determine that it is better to handover UE 128 to dedicated eNB 116, for example where dedicated eNB 116 comprises a small cell capable of matching to the traffic characteristics of UE 128. In such an arrangement, one condition to trigger a handover to dedicated eNB 116 may be where eNB 110 knows that certain frequencies and/or dedicated eNBs 116 are suitable for certain dedicated services and when UE 128 reports such services through a legacy measurement report message sent at step 410. Another condition to trigger a handover to dedicated eNB 116 may be where a new indicator is added in a current measurement report sent at step 410 to indicate that one or more certain types of dedicated eNBs 116 have been detected. Alternatively, such a new message may be utilized to indicate to the currently associated eNB 110 that one or more certain types of dedicated eNBs 116 have been detected by UE 128 during a measurement procedure while UE 128 is in an RRC_CONNECTED mode. Such an arrangement may be considered as some form of UE assisted dedicated eNB selection, and network 100 may execute a handover decision 412 to decide whether or not to handover UE 128 to dedicated eNB 116 or not based on an internal implementation. In the event it is decided to handover UE 128 to dedicated eNB 116, a handover preparation message may be sent from currently connected eNB 110 to dedicated eNB 116 at step 414, and dedicated eNB 116 may issue a handover command at step 416 to currently connected eNB 110 which in turn sends a RRC Connection Reconfiguration message to UE 128 at step 418 so that UE 128 may be reconfigured to connect with dedicated eNB 116.

Figure 5:
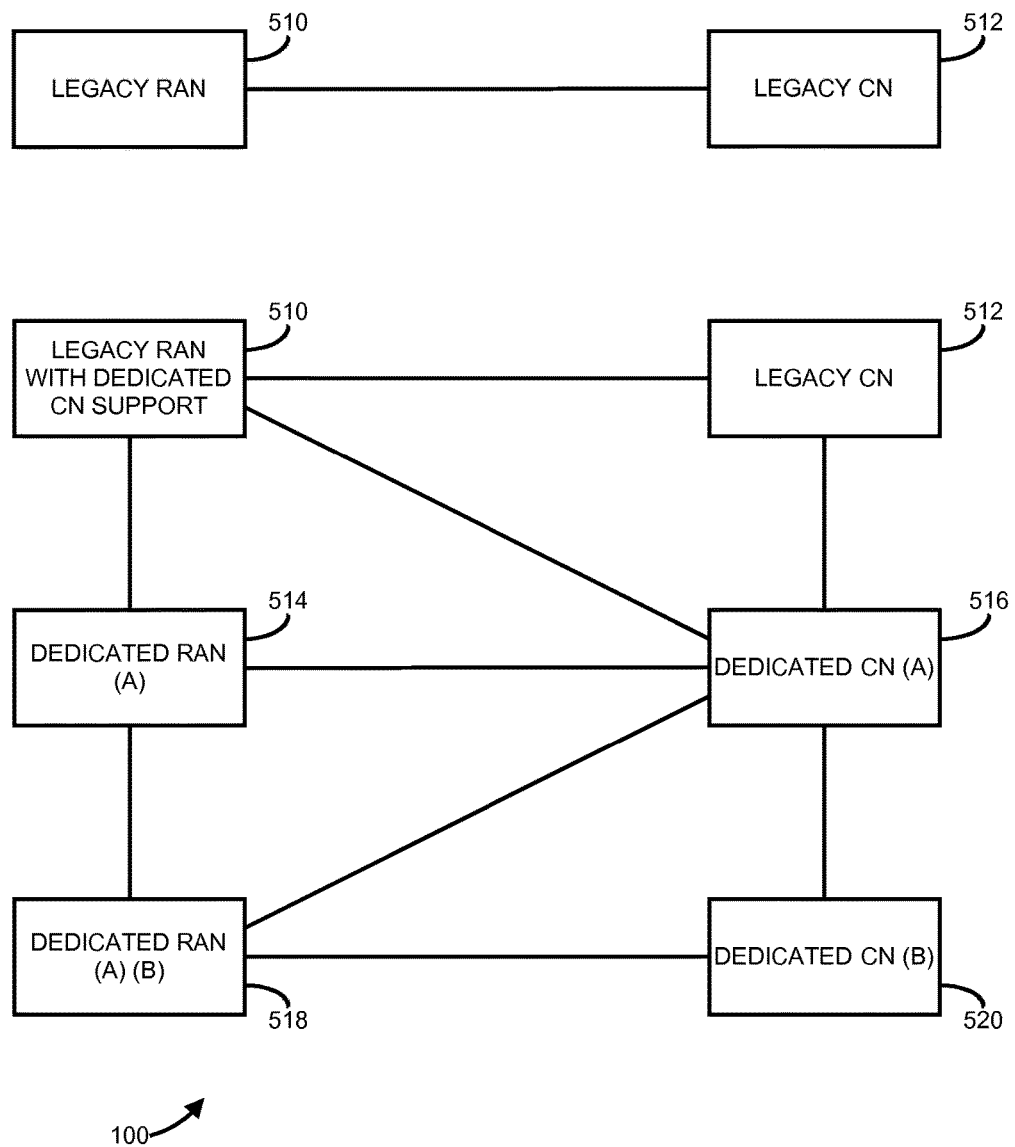
FIG. 5 is a diagram of interaction of dedicated and non-dedicated radio access nodes and core network nodes in accordance with one or more embodiments.

Referring now to FIG. 5, a diagram of interaction of dedicated and non-dedicated radio access nodes and core network nodes in accordance with one or more embodiments will be discussed. FIG. 5 illustrates a first case in which legacy radio access network (RAN) 510 is capable of supporting legacy core network (CN) 512. In one embodiment, legacy RAN 510 may include support for dedicated CN (A) 516 such that legacy RAN 510 may interface with either legacy CN 512 or dedicated CN (A) 516, either directly or by using dedicated RAN (514). In one particular embodiment, dedicated RAN (A) 514 of a first type, indicated as type (A), is capable of interfacing with dedicated CN (A) 516 which is also type (A). In another embodiment, dedicated RAN (A) (B) 518 may be capable of interfacing with dedicated CN (A) 516 which is type (A), and with dedicated CN (B) 520 which is type (B).

One option on how user equipment (UE) 128 is capable of selecting or otherwise being directed to one or more network nodes comprises using a new broadcast Information Element (IE) that identifies the support of a dedicated eNB 116 and potentially the kind of dedicated characteristics, services, or categories that are capable of being supported. This kind of information could be conveyed in different ways. A first new way of indicating the network support may comprise a new optional access class barring indication for dedicated support as part of system information, for example System Information Block 2 (SIB2) as defined in a Third Generation Partnership Project (3GPP) standard, although the scope of the claimed subject matter is not limited in this respect. This access class barring may indicate when UE 128 access is barred for the case where UE 128 is trying to access network 100 due to support of certain dedicated services. For example, eNB 110 of legacy RAN 510 may be connected to legacy CN 512 as well as to dedicated CN (A) 516 supporting certain special services. There may be cases in which eNB 110 of legacy RAN 510 wants to bar UEs 128 accessing dedicated CN 516 without barring all the other UEs 128 that are terminating in legacy CN 512. Depending on how the dedicated networks are categorized, different access barring classes might be defined, for example extended access barring (EAB) dedicated small data, EAB dedicated periodic data, or different generic categories may be defined, for example EAB dedicated category 1, EAB dedicated category 2, and so on.

Another new way of indicating the network support may comprise a new optional indicator for the support of the specific dedicated networks as part of system information, for example SIB2 which may include new information elements that indicates the support of dedicated eNB 116 and/or dedicated CN 516. For example, as shown in FIG. 5, legacy RAN 510 having dedicated CN support may indicate its support of dedicated CN 516 and also when legacy RAN 510 is optimized only for dedicated usage. Such support also may refer to the specific category of dedicated network. In another embodiment, dedicated RAN 518 may support two types of dedicated core networks such as dedicated CN (A) 516 and dedicated CN (B) 520.

Another new way of indicating the network support may comprise an option to define a new radio resource control (RRC) message specific to redirect or handover machine-type-communication (MTC) UEs 128 to dedicated eNBs 116. Such a new control message may be defined to redirect or handover the MTC UEs 128 or the existing handover or redirect message may be reused by eNB 116 carrying only necessary information elements, for example when there is no X2 interface to that dedicated eNB 116. A new handover message may be defined and could be utilized specifically to move UEs 128 to dedicated networks or a current handover message may be enhanced, or specific information that might be useful for the target dedicated eNB 116 may be updated.

Yet another new way of indicating network support may comprise an option using core network assistance information or information specific to the UE 128 coming for example from UE 128 or Home Subscriber Service (HSS) as trigger for redirecting carrier and/or network selection. As part of Release 12 of the 3GPP standard, core network assistance information in relation to the device traffic or activity pattern configuration might be included. In one or more embodiments, mobility management entity (MME) 112 and/or eNB 110 may use this kind of information to determine if it should suggest for UE 128 to connect to a different cell. Such a decision may be taken by MME 112 or eNB 110 when this traffic related assistance information is available and at that point network 100 might decide to release the connection indicating a redirectCarrier message or the list of information about those dedicated eNBs 116 that should instead be used for connection. Optionally, network 100 might trigger a handover to the other node, for example as discussed herein.

Figure 6:
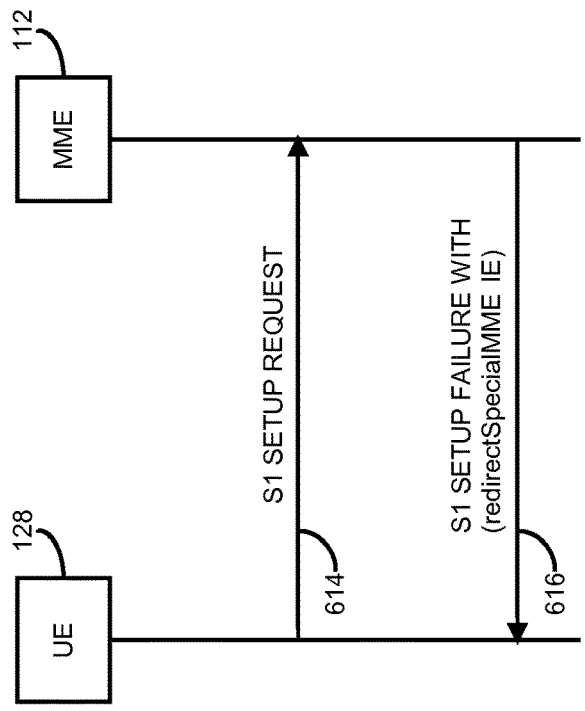
FIG. 6 is a diagram of S1 signaling to select a dedicated or special mobility management entity in accordance with one or more embodiments.
Figure 6:
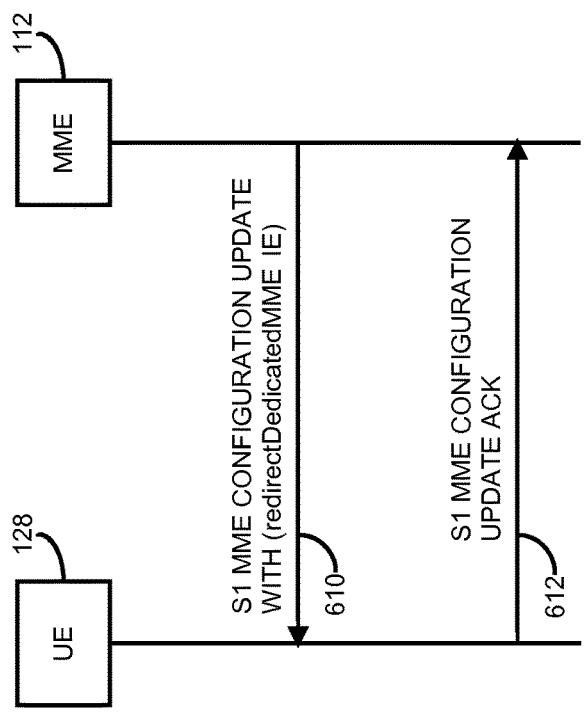
Figure 7A:
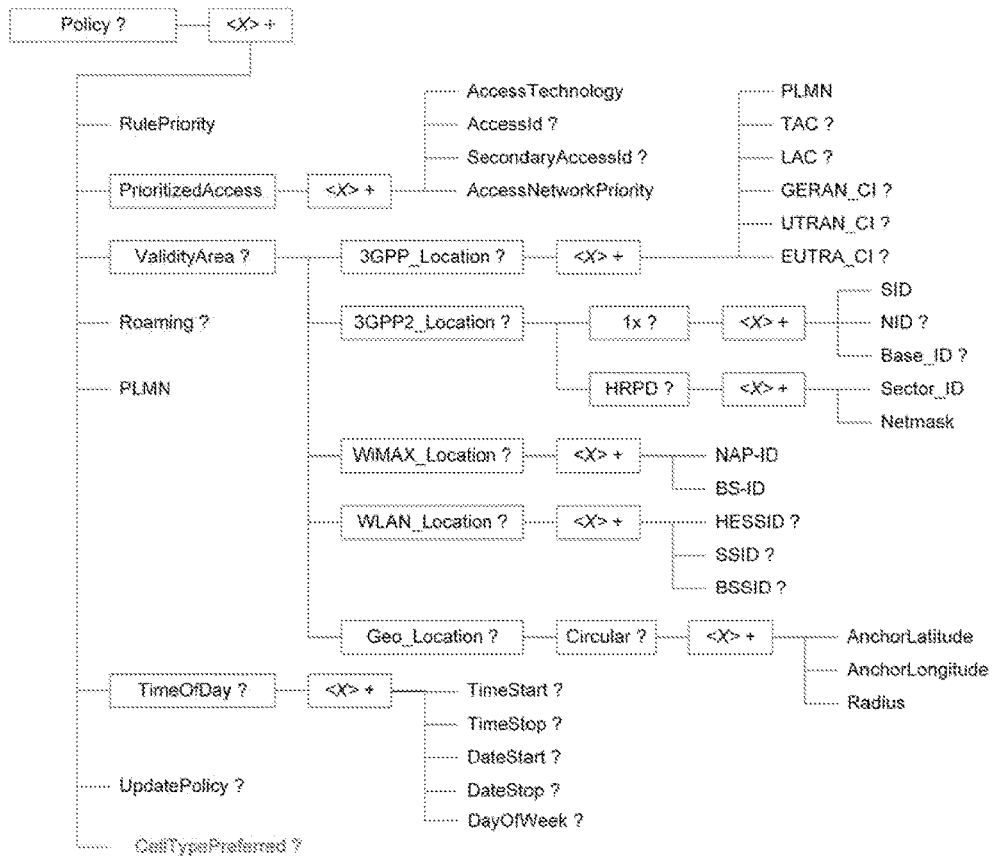
FIG. 7A is a diagram of an extended Access Network Discover and Selection Function (ANDSF) Management Object (MO) for a cell type preferred by a user equipment in accordance with one or more embodiments.
Figure 7B:
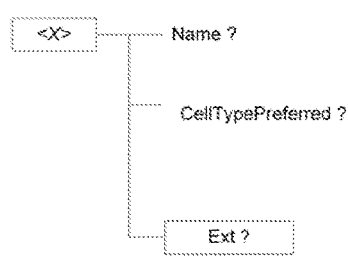
FIG. 7B is a diagram of a new standalone Management Object (MO) for a cell type preferred by a user equipment in accordance with one or more embodiments.
Figure 8A:
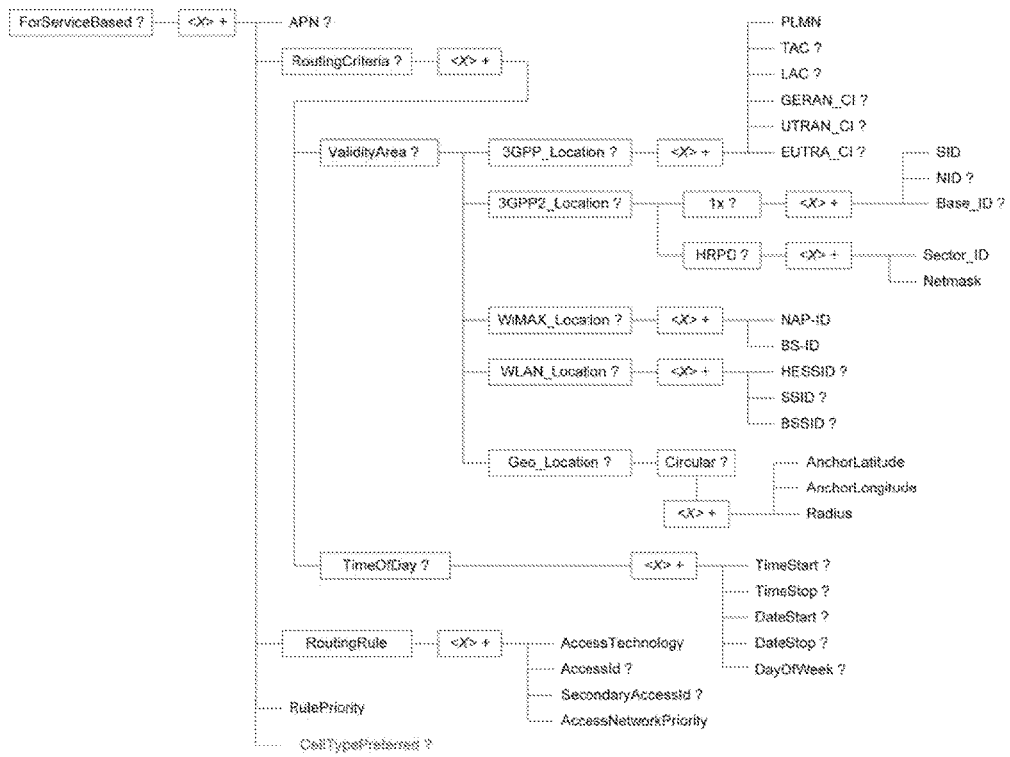
FIG. 8A is a diagram of an extended Access Network Discover and Selection Function (ANDSF) Management Object (MO) for a cell type preferred per access point name (APN) in accordance with one or more embodiments.
Figure 8B:
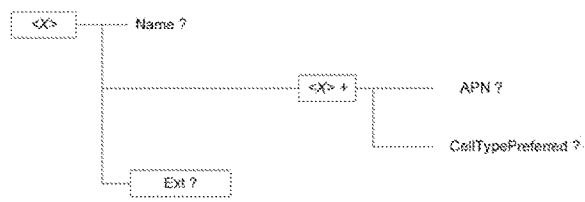
FIG. 8B is a diagram of a new standalone Management Object (MO) for a cell type preferred per access point name (APN) in accordance with one or more embodiments.
Figure 9A:
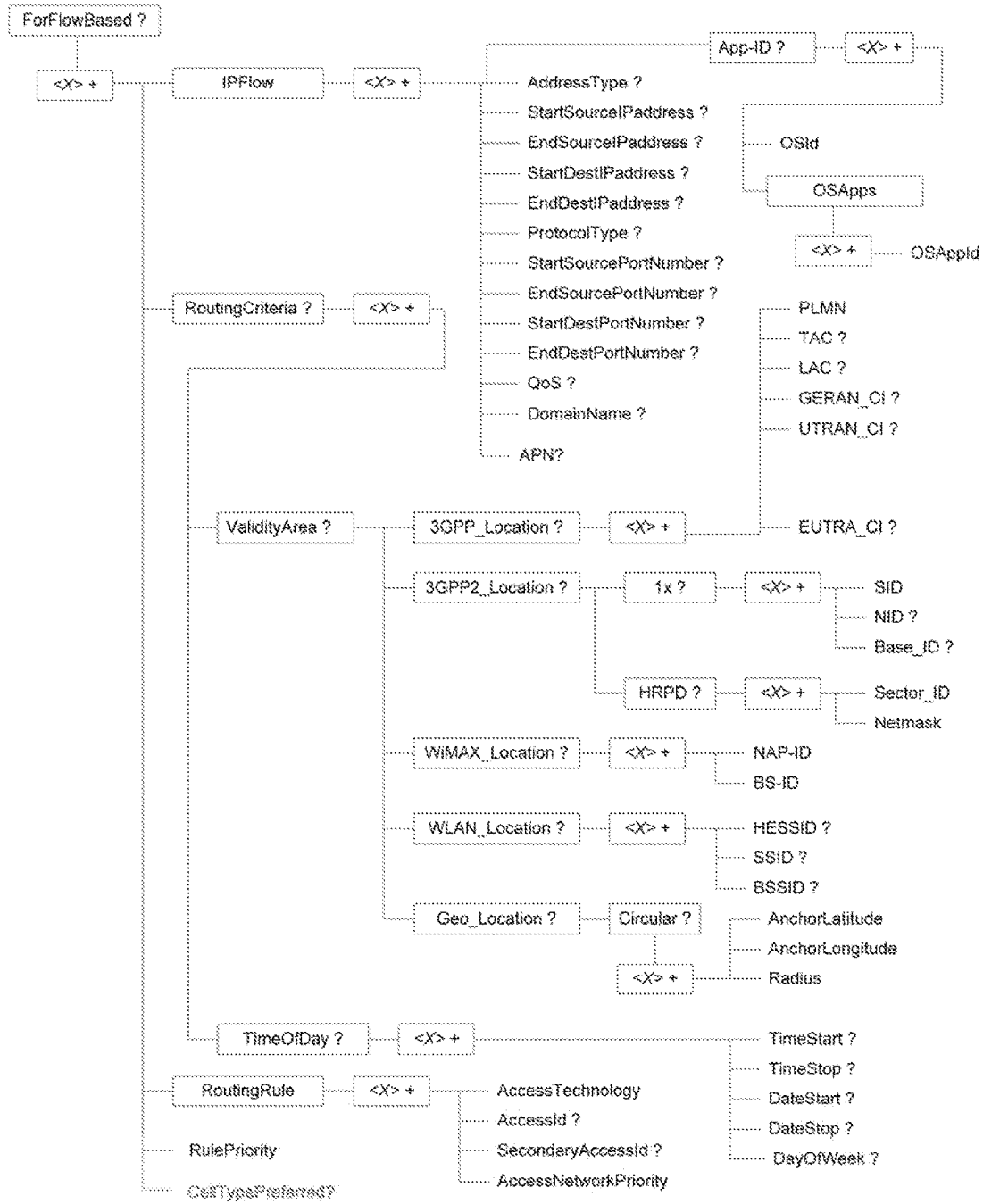
FIG. 9A is a diagram of an extended Access Network Discover and Selection Function (ANDSF) Management Object (MO) for a cell type preferred per flow in accordance with one or more embodiments.
Figure 9B:
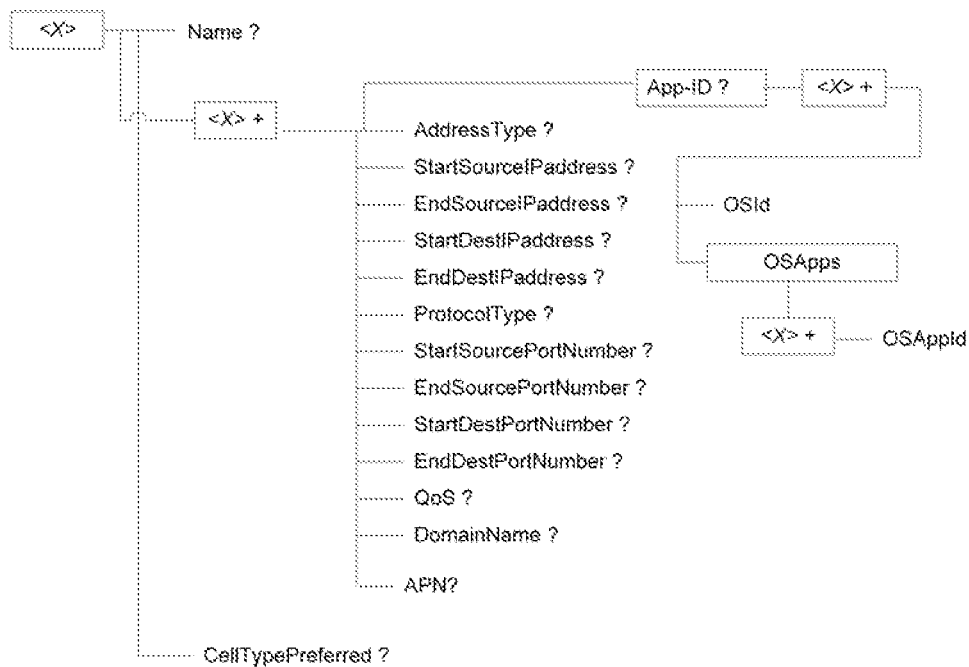
FIG. 9B is a diagram of a new standalone Management Object (MO) for a preferred cell type per flow per application in accordance with one or more embodiments.
Figure 10A:
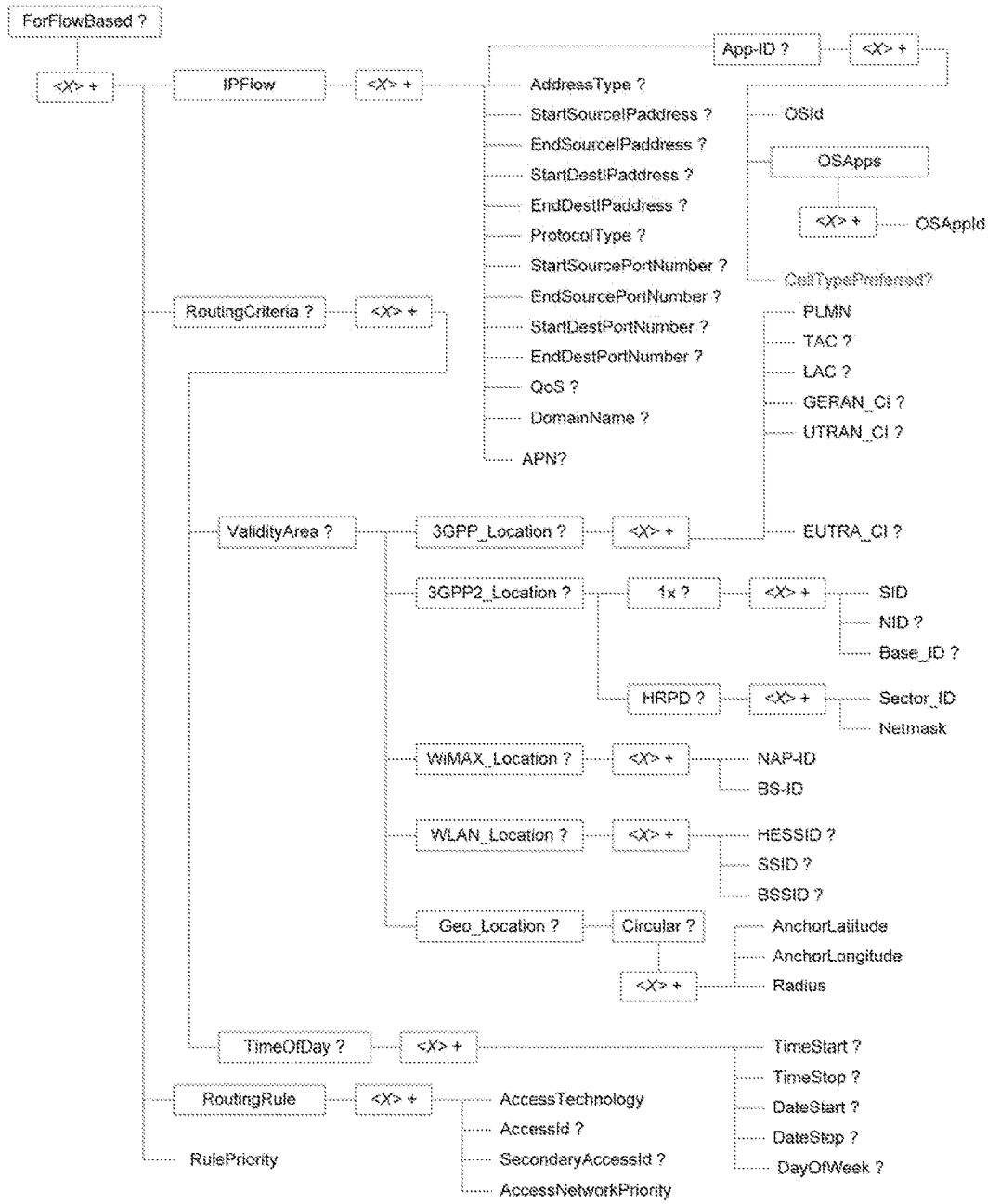
FIG. 10A is a diagram of an extended Access Network Discover and Selection Function (ANDSF) Management Object (MO) for a preferred cell type preferred per application in accordance with one or more embodiments.
Figure 10B:
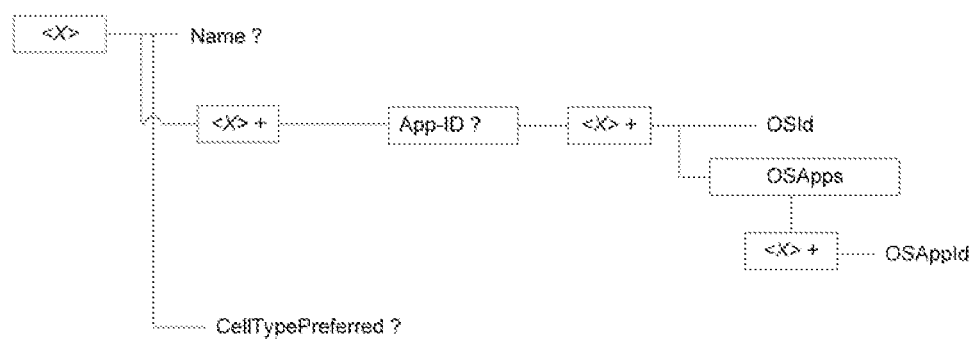
FIG. 10B is a diagram of a new standalone Management Object (MO) for a preferred cell type per application in accordance with one or more embodiments.

Referring now to FIG. 6, a diagram of S1 signaling to select a dedicated or special mobility management entity in accordance with one or more embodiments will be discussed. In one or more embodiments dedicated eNB 116 as shown in FIG. 1 may select a special category of mobility management entity (MME) 112, for example an MME 112 dedicated for machine-type-communication (MTC) purposes or a low cost MME 112 belonging to the dedicated overlay networks, to support special classes of devices. A first option to select a special or dedicated MME 112 may comprise using S1 signaling. The embodiments of FIG. 6 may be applied to a case where dedicated core network (CN) nodes are connected to legacy radio access network (RAN) nodes as well as dedicated RAN nodes. In such embodiments, a non-dedicated or legacy MME 112 for the specific category would convey the adequate information to a dedicated RAN node or a non-dedicated RAN node. In one or more embodiments, MME 112 may indicate this special category over the S1 interface to eNB 110 either by updating existing S1 messages or by defining a new S1 message. As an example, two S1 signaling options may be utilized to select a special or dedicated MME 118 as triggered by MME 112. Such two S1 messages may be utilized by MME 112 to redirect an eNB 110 to a special or dedicated MME 118. Information about dedicated MME 118 may be conveyed in a new information element redirectDedicatedMME in an S1 MME Configuration Update message sent from MME 112 to UE 128 at step 610. In response, UE 128 may send an S1 MME Configuration Update Acknowledgment (ACK) message to MME 112 at step 612. Similarly, UE 128 may send an S1 Setup Request message to MME 112 at step 614, and MME 112 may send an S1 setup failure message with redirectSpecialMME information element to UE 128 at step 616.

Another option to select a dedicated or special mobility management entity may comprise using eNB advertisement and/or broadcast information. In a given network 100, it may be possible that dedicated eNB 116 is connected to a certain set of MMEs including special or dedicated MMEs 118 whereas there may be other cells and/or eNBs 110 within the public land mobile network (PLMN) of UE 128 as well cells and/or eNBs 110 that are not associated with special or dedicated MMEs 118. Alternatively, the category of special or dedicated MMEs 118 may have subcategories supporting specific unique characteristics such that different eNBs 110 or dedicated eNBs 116 may be associated with one or more different subcategories. Example categories or subcategories may be based on support of frequent bursts of data, support of infrequent type of data, support of power saving mode (PSM), and so on. The cells and/or eNBs 110 or dedicated eNBs 116 may advertise such information, and UEs 128 and/or other interested devices may connect to the eNBs 110 or dedicated eNBs 116 accordingly.

In example Abstract Syntax Notation One (ASN.1) code shown, below, eNB 110 or dedicated eNB 116 may advertise in a new System Information Block (SIB) the Mobility Management Entity (MME) category to which it is connected to by a given field supportMMEcatX, supportDedicatedMMEclassX, or supportSpecialMMEIoTsupported where the categories and classes mapping are pre-defined. In the example, below, one example method of using the list of MME categories is shown.

```
-- A3N1START
SystemInformationBlockTypeZZ ::=      SEQUENCE {
    mme-ParamConfigList                   MME-ParamConfigList    OPTIONAL,
    lateNonCriticalExtension              OCTET STRING           OPTIONAL
}
MME-ParamConfigList                   SEQUENCE {SIZE (1..maxMME)} OF MME-Param-Config
MME-ParamConfig ::= SEQUENCE {
    supportMMEcatZ                    ENUMERATED {cat-1, cat-2, cat-3, cat-4, spare4, spare3, spare2, spare1}
    OPTIONAL,
    }
-- A3N1STOP
```

In one or more embodiments, a dedicated packet gateway (P-GW) 120 as shown in FIG. 1 may be selected using a P-GW selection function. For example a specific access point name (APN) for dedicated P-GW selection may be utilized wherein specific access point name (APN) configuration data may be configured as part of a user equipment (UE) subscription in Home Subscriber Service (HSS). This information may be provided to mobility management entity (MME) 112 as part of initial attach which allows MME 112 to select dedicated P-GW 118. A specific access point name (APN) also may be configured in UE 128, and UE 128 may select a request for a specific access point name (APN) instead of the default access point name (APN). In one or more embodiments, HSS subscription provides information for dedicated P-GW selection, for example HSS may provide a specific Access Point Name Operator Identifier (APN-OI) replacement which MME 112 uses to construct an Access Point Name-Fully Qualified Domain Name (APN-FQDN) for domain name server (DNS) query. A DNS query may provide the address of dedicated P-GW 120, for example, Format P-GW<dedicated>.MCC<mcc>.MNC<mnc>.gprs<dedicated> may be replaced by keywords such as low-access-priority, machine-type-communication (MTC), and so on. A new "service parameter" for a Straightforward-Naming Authority Pointer (S-NAPTR). The S-NAPTR procedure may be defined for example in Internet Engineering Task Force (IETF) Request for Comments (RFC) 3958 and/or Third Generation Partnership Project (3GPP) Technical Specification (TS) 29.303. Such a new service parameter may be defined for selection of dedicated P-GW as follows:

"x-3gpp-pgw:x-<interfacename>-<protocol>-<dedicated-keyword>"

wherein the interface may comprise S5, S8, S2a, S2b, the protocol may comprise a General Packet Radio Service (GPRS) Tunneling Protocol (GTP) or a Proxy Mobile Internet Protocol version 6 (IPv6) (PMIP), and the dedicated-keyword may comprise machine-type-communication (MTC), Low Access Priority Indication (LAPI), and so on. It should be noted that the same procedure may also apply for selection of other dedicated network nodes, for example a serving gateway (S-GW), a serving GPRS support node (SGSN), a gateway GPRS support node (GGSN), and so on, and the scope of the claimed subject matter is not limited in this respects.

Referring now to FIG. 7A-7B, FIG. 8A-8B, FIG. 9A-9B, and FIG. 10A-10B, diagrams or an Access Network Discover and Selection Function (ANDSF) Management Object (MO) and a new standalone Management Object (MO) for a preferred cell type in accordance with one or more embodiments will be discussed. Using Open Mobile Alliance-Device Management (OMA-DM) procedures, user equipment (UE) 128 may be configured with a preferred type of cell via an Open Mobile Alliance-Management Object (OMA-MO). As UE 128 may be multi-faceted, supporting multiple different services, at times preferring to connect to a dedicated network, and at times having no preference, the selection may be done when UE 128 is establishing a radio resource control (RRC) connection. In this case, UE 128 may or may not be camped on a cell, and UE 128 will check the information regarding the cell before establishing an RRC connection for a specific service. Then UE 128 will know the type of each cell, for example by reading information broadcast in the cell, such as the System Information Block 1 (SIB1) information. When initiating connection establishment, UE 128 will choose a cell to be the preferred cell based on the OMA-MO rules, assuming multiple cells are available. The configuration of the preferred cell type can be done via new OMA-MO or by enhancing existing OMA-MO rules such as enhancing the rules for Access Network Discovery and Selection Function (ANDSF) to also include the preferred type of cell. Inclusion of such rules into other existing Management Objects is also possible, and the scope of the claimed subject matter is not limited in these respects. Such examples include a cell type preference configuration for a UE-based case, a cell type preference configuration for an access point name (APN)-based case, a cell type preference configuration for a flow-based case (service specific), or a per application case.

In one or more embodiments of a cell type preference configuration for a UE-based case, in order to know if UE 128 should give preference to connect to a dedicated network, UE 128 could be preconfigured as such. One way to preconfigure the UE 128 is by using an Access Network Discovery and Selection Function (ANDSF) Management Object (MO), where "Cell Type Preferred" may be added to include the preferred type of cell. In Table 1, Table 2, and Table 3, below examples of possible values for the new CellTypePreferred leaf are given where the preference indication may be given per dedicated network, MME category, or RAN node category. CellTypePreferred can be an optional parameter in the configuration. The CellTypePreferred parameter map comprise:

<X>/Policy/CellTypePreferred

The CellTypePreferred leaf indicates a prioritized cell type.

Occurrence: One

Format: int

Access Types: Get, Replace

Values: <CellTypePreferred>

Possible values for the CellTypePreferred parameter are specified in Table 1, Table 2, and Table 3, below.

TABLE 1

Example of possible values for the CellTypePreferred leaf
(dedicated network indication)

| Value | Description |
| --- | --- |
| 0 | Reserved |
| 1 | No Preference |
| 2 | Dedicated network preferred |
| 3-255 | Reserved |

TABLE 2

Example of possible values for the CellTypePreferred leaf
(MME-category preference indication)

| Value | Description |
| --- | --- |
| 0 | Reserved |
| 1 | No Preference |
| 2 | SupportMMEcategory-X preferred |
| 3 | SupportMMEcategory-Y preferred |
| 4 | SupportMMEcategory-Z preferred |
| 5 | SupportMMEcategory-X or Y preferred |
| 6 | SupportMMEcategory-X or Z preferred |
| 7 | SupportMMEcategory-Y or Z preferred |
| 8-255 | Reserved |

TABLE 3

Example of possible values for the CellTypePreferred leaf
(RAN-node-category preference indication)

| Value | Description |
| --- | --- |
| 0 | Reserved |
| 1 | No Preference |
| 2 | RAN-Node-category-X preferred |
| 3 | RAN-Node-category-Y preferred |
| 4 | RAN-Node-category-Z preferred |
| 5 | RAN-Node-category-X or Y preferred |
| 6 | RAN-Node-category-X or Z preferred |
| 7 | RAN-Node-category-Y or Z preferred |
| 8-255 | Reserved |

It should be noted that the number of bits shown in Table 1, Table 2, and Table 3 may vary and that the suggested values are shown as examples. The mapping and specific names used also are shown as examples only. In one or more embodiments, Table 1, Table 2, and/or Table 3 may be utilized to identify the type of cell UE 128 should give preference to connect to.

In another embodiment of a cell type preference configuration for an access point name (APN)-based case, one or more APNs may be configured with a preferred type of cell. If an application is requesting the establishment of a connection towards a specific APN, UE 128 will choose a cell to be the preferred based on the type of APN, for example if there are multiple cells available.

In yet another embodiment of a cell type preference configuration for Flow-based case (service specific), one or more applications may be configured with a preferred type of cell. If an application is requesting the establishment of a connection, UE 128 will choose a cell to be the preferred based on the type of application, for example assuming there are multiple cells available. This can be done per IP flow for multiple applications or individually per application.

Figure 11:
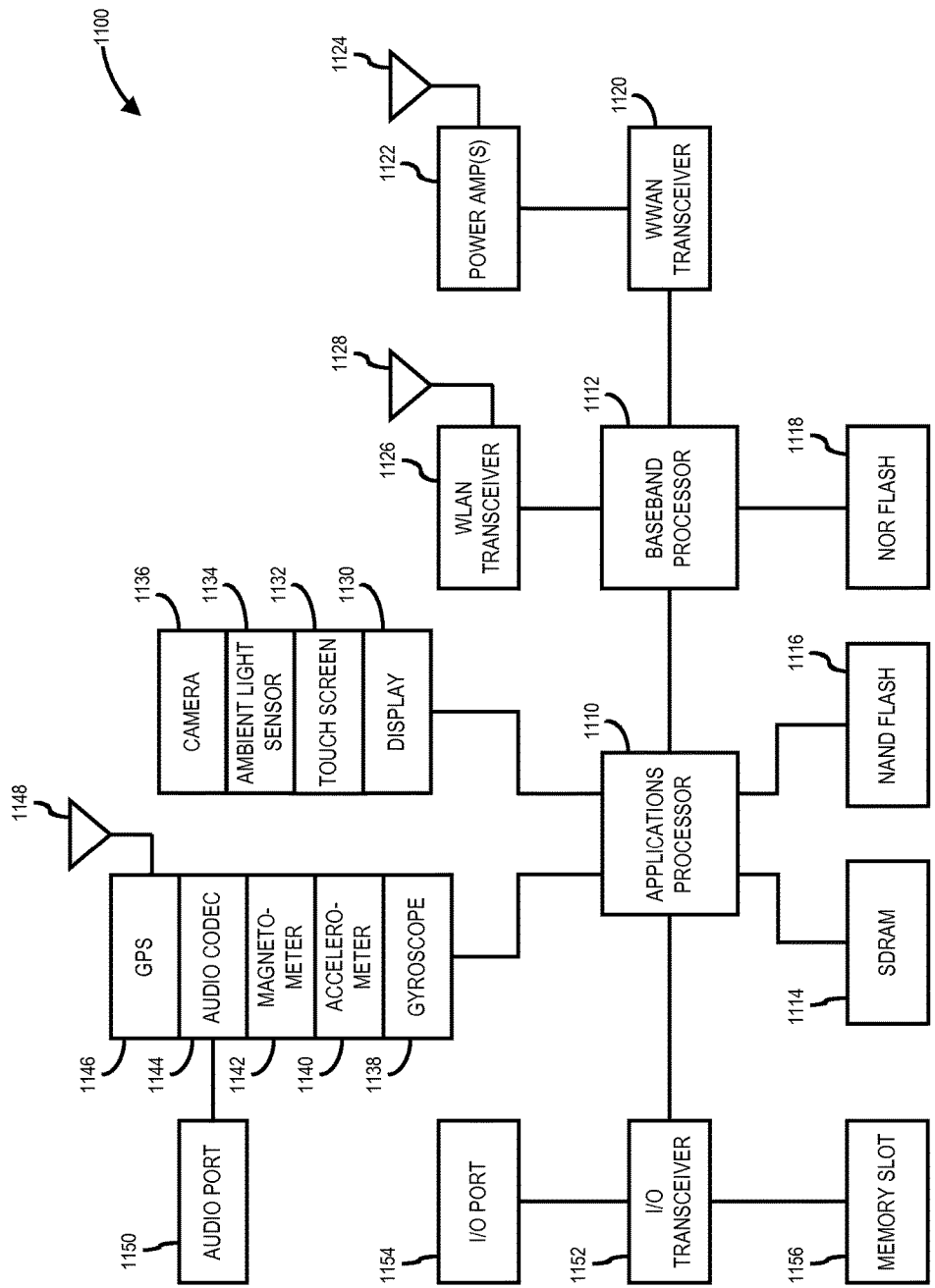
FIG. 11 is a block diagram of an information handling system capable communication via one or more dedicated network nodes in accordance with one or more embodiments.

Referring now to FIG. 11, a block diagram of an information handling system capable communication via one or more dedicated network nodes in accordance with one or more embodiments will be discussed. Information handling system 1100 of FIG. 11 may tangibly embody any one or more of the elements described herein, above, including for example UE 128, eNB 110, dedicated eNB 116, MME/S-GW 112, dedicated MME/S-GW 118, P-GW 114, dedicated P-GW 120, ANDSF 126, with greater or fewer components depending on the hardware specifications of the particular device. Although information handling system 1100 represents one example of several types of computing platforms, information handling system 1100 may include more or fewer elements and/or different arrangements of elements than shown in FIG. 11, and the scope of the claimed subject matter is not limited in these respects.

In one or more embodiments, information handling system 1100 may include an application processor 1110 and a baseband processor 1112. Application processor 1110 may be utilized as a general-purpose processor to run applications and the various subsystems for information handling system 1100. Application processor 1110 may include a single core or alternatively may include multiple processing cores wherein one or more of the cores may comprise a digital signal processor or digital signal processing (DSP) core. Furthermore, application processor 1110 may include a graphics processor or coprocessor disposed on the same chip, or alternatively a graphics processor coupled to application processor 1110 may comprise a separate, discrete graphics chip. Application processor 1110 may include on board memory such as cache memory, and further may be coupled to external memory devices such as synchronous dynamic random access memory (SDRAM) 1114 for storing and/or executing applications during operation, and NAND flash 1116 for storing applications and/or data even when information handling system 1100 is powered off. In one or more embodiments, instructions to operate or configure the information handling system 1100 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 1112 may control the broadband radio functions for information handling system 1100. Baseband processor 1112 may store code for controlling such broadband radio functions in a NOR flash 1118. Baseband processor 1112 controls a wireless wide area network (WWAN) transceiver 1120 which is used for modulating and/or demodulating broadband network signals, for example for communicating via a 3GPP LTE or LTE-Advanced network or the like.

In general, WWAN transceiver 1120 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CPDP), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 1120 couples to one or more power amps 1142 respectively coupled to one or more antennas 1124 for sending and receiving radio-frequency signals via the WWAN broadband network. The baseband processor 1112 also may control a wireless local area network (WLAN) transceiver 1126 coupled to one or more suitable antennas 1128 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 1110 and baseband processor 1112, and the scope of the claimed subject matter is not limited in these respects. For example, any one or more of SDRAM 1114, NAND flash 1116 and/or NOR flash 1118 may comprise other types of memory technology such as magnetic memory, chalcogenide memory, phase change memory, or ovonic memory, and the scope of the claimed subject matter is not limited in this respect.

In one or more embodiments, application processor 1110 may drive a display 1130 for displaying various information or data, and may further receive touch input from a user via a touch screen 1132 for example via a finger or a stylus. An ambient light sensor 1134 may be utilized to detect an amount of ambient light in which information handling system 1100 is operating, for example to control a brightness or contrast value for display 1130 as a function of the intensity of ambient light detected by ambient light sensor 1134. One or more cameras 1136 may be utilized to capture images that are processed by application processor 1110 and/or at least temporarily stored in NAND flash 1116. Furthermore, application processor may couple to a gyroscope 1138, accelerometer 440, magnetometer 1142, audio coder/decoder (CODEC) 1144, and/or global positioning system (GPS) controller 1146 coupled to an appropriate GPS antenna 1148, for detection of various environmental properties including location, movement, and/or orientation of information handling system 400. Alternatively, controller 1146 may comprise a Global Navigation Satellite System (GNSS) controller. Audio CODEC 1144 may be coupled to one or more audio ports 1150 to provide microphone input and speaker outputs either via internal devices and/or via external devices coupled to information handling system via the audio ports 1150, for example via a headphone and microphone jack. In addition, application processor 410 may couple to one or more input/output (I/O) transceivers 1152 to couple to one or more I/O ports 1154 such as a universal serial bus (USB) port, a high-definition multimedia interface (HDMI) port, a serial port, and so on. Furthermore, one or more of the I/O transceivers 1152 may couple to one or more memory slots 1156 for optional removable memory such as secure digital (SD) card or a subscriber identity module (SIM) card, although the scope of the claimed subject matter is not limited in these respects.

Figure 12:
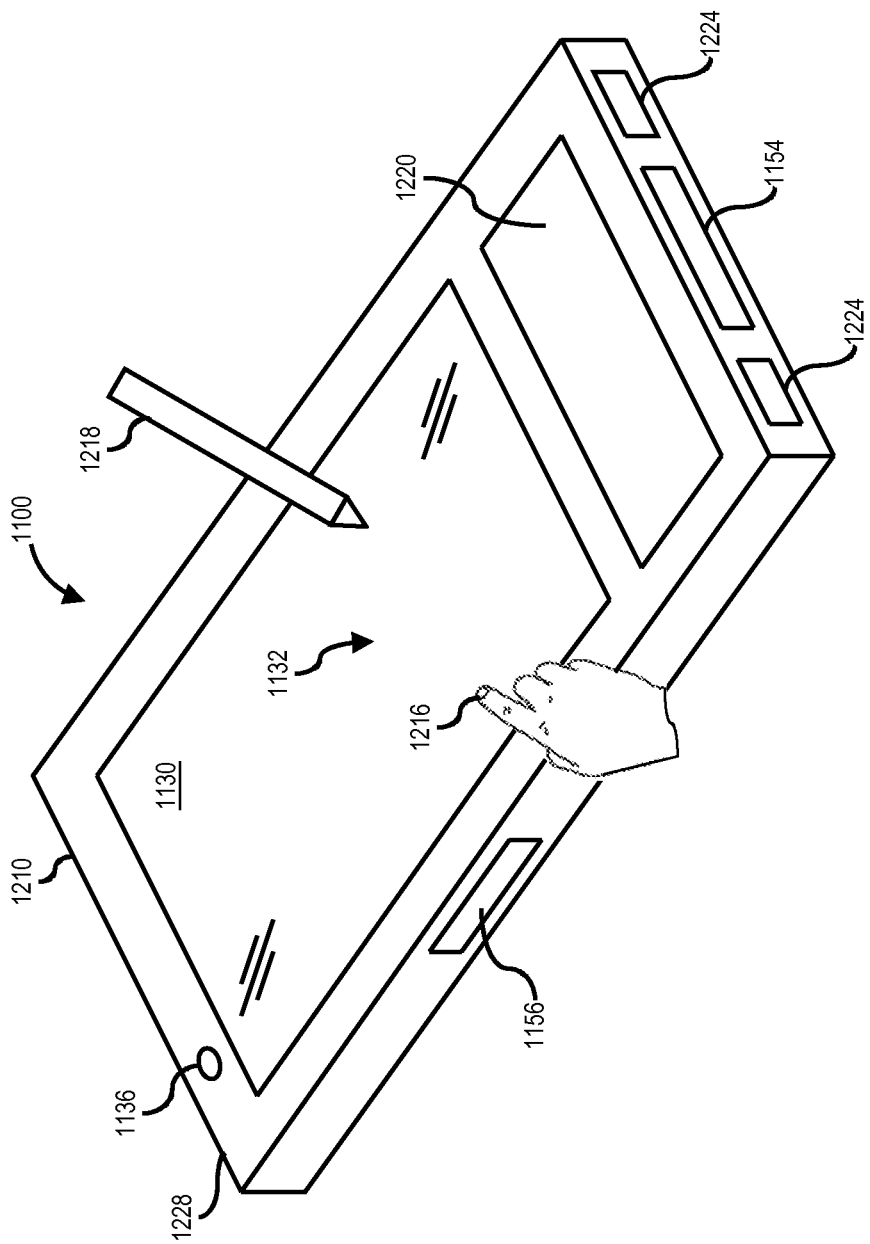
FIG. 12 is an isometric view of an information handling system of FIG. 11 that optionally may include a touch screen in accordance with one or more embodiments.

Referring now to FIG. 12, an isometric view of an information handling system of FIG. 11 that optionally may include a touch screen in accordance with one or more embodiments will be discussed. FIG. 12 shows an example implementation of information handling system 1100 of FIG. 11 tangibly embodied as a cellular telephone, smartphone, or tablet type device or the like. The information handling system 1100 may comprise a housing 1210 having a display 1130 which may include a touch screen 1132 for receiving tactile input control and commands via a finger 1216 of a user and/or a via stylus 1218 to control one or more application processors 1110. The housing 1210 may house one or more components of information handling system 1100, for example one or more application processors 1110, one or more of SDRAM 1114, NAND flash 1116, NOR flash 1118, baseband processor 1112, and/or WWAN transceiver 1120. The information handling system 1100 further may optionally include a physical actuator area 1220 which may comprise a keyboard or buttons for controlling information handling system via one or more buttons or switches. The information handling system 1100 may also include a memory port or slot 1156 for receiving non-volatile memory such as flash memory, for example in the form of a secure digital (SD) card or a subscriber identity module (SIM) card. Optionally, the information handling system 1100 may further include one or more speakers and/or microphones 1224 and a connection port 1154 for connecting the information handling system 1100 to another electronic device, dock, display, battery charger, and so on. In addition, information handling system 1100 may include a headphone or speaker jack 1228 and one or more cameras 1136 on one or more sides of the housing 1210. It should be noted that the information handling system 1100 of FIG. 12 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to communication via dedicated network nodes and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A mobility management entity (MME) to redirect a dedicated user equipment (UE) from a non-dedicated enhanced Node B (eNB) to a dedicated enhanced Node B (eNB), comprising:
   a processor and memory coupled to the processor, wherein instructions in the memory configure the processor to:
   receive a Non-Access Stratum (NAS) message from the dedicated UE via the non-dedicated eNB while the dedicated UE is connected to the non-dedicated eNB, wherein the NAS message includes a power saving mode (PSM) information element;
   wherein the MME determines whether to redirect the dedicated UE to the dedicated eNB based on the PSM information element in the NAS message; and
   send a release command to the non-dedicated eNB in response to the PSM information element in the NAS message, the release command to cause the non-dedicated eNB to send a connection release message to the dedicated UE, wherein the connection release message includes a carrier redirect message to redirect the dedicated UE from the non-dedicated eNB to the dedicated eNB.

2. The mobility management entity as claimed in claim 1, wherein the NAS message from the dedicated UE is transmitted via a radio resource control (RRC) connection setup.

3. The mobility management entity as claimed in claim 1, wherein the release command sent to the non-dedicated eNB includes the PSM indication as a cause for the release command.

4. A mobility management entity (MME) to redirect a dedicated user equipment (UE) from a non-dedicated enhanced Node B (eNB) to a dedicated enhanced Node B (eNB), comprising:
   means for receiving a Non-Access Stratum (NAS) message from the dedicated UE via the non-dedicated eNB while the dedicated UE is connected to the non-dedicated eNB, wherein the NAS message includes a power saving mode (PSM) information element;
   wherein the MME determines whether to redirect the dedicated UE to the dedicated eNB based on the PSM information element in the NAS message; and
   means for sending a release command to the non-dedicated eNB in response to the PSM information element in the NAS message, the release command to cause the non-dedicated eNB to send a connection release message to the dedicated UE, wherein the connection release message includes a carrier redirect message to redirect the dedicated UE from the non-dedicated eNB to the dedicated eNB.

5. The mobility management entity as claimed in claim 4, wherein the NAS message from the dedicated UE is received via a radio resource control (RRC) connection setup.

6. The mobility management entity as claimed in claim 4, wherein the release command sent to the non-dedicated eNB includes the PSM indication as a cause for the release command.

* * * * *